Nov. 27, 1951 O. G. VILLARD, JR 2,576,429

SINGLE SIDE-BAND SIGNAL GENERATOR

Filed Jan. 31, 1950

INVENTOR.
OSWALD G. VILLARD JR.
BY Wade Koontz
ATTORNEY and
James S. Shannon
AGENT Patented Nov. 27, 1951

2,576,429

UNITED STATES PATENT OFFICE 2,576,429

SINGLE SIDE-BAND SIGNAL GENERATOR

Oswald G. Villard, Jr., Palo Alto, Calif., assignor to the United States of America as represented by the Secretary of the Air Force Application January 31, 1950, Serial No. 141,366

5 Claims. (Cl. 332—45)

This invention relates in general to modulating systems and in particular to a modulating system for producing a single side-band signal.

A single side-band radio signal may be generated by adding or subtracting the output signals of two carrier-suppressed amplitude modulators in which there is a quadrature phase relationship between the two carriers and also between the two modulating signals. When two such carrier-suppressed signals are added or subtracted either the upper or the lower side-band cancels out leaving only a single side-band. This method of single side-band generation, however, requires the use of a 90° radio frequency phase shifting network to insure the required quadrature phase relationship between the carriers in the two modulators. The adjustment of such a network is critical and must be changed each time there is a change in carrier frequency. In a transmitter to be operated by relatively unskilled personnel and in which the frequency of operation must be frequently changed, the absence of this critical adjustment would be of considerable advantage. It is therefore the object of the invention to provide a single side-band signal generator which does not require the use of a radio frequency phase shifting network or other phase shifting network requiring adjustment each time the frequency of operation is changed.

This object is attained by taking advantage of the fact that, for the same carrier phase, the radio frequency phase of the first-order side bands of a phase modulated wave is 90° from that of the two side bands of an amplitude modulated wave. The single side-band generator in accordance with the invention comprises a carrier-suppressing phase modulator and a carrier-suppressing amplitude modulator with the carrier frequency applied in the same phase to the two modulators and with the phase of the modulating signal applied to the amplitude modulator shifted 90° relative to that applied to the phase modulator. When the output signals of the two modulators are added or subtracted only a single side band remains, as in the preceding case. The two modulators may be located in parallel channels or may be connected in cascade as will be seen later.

Figure 1:
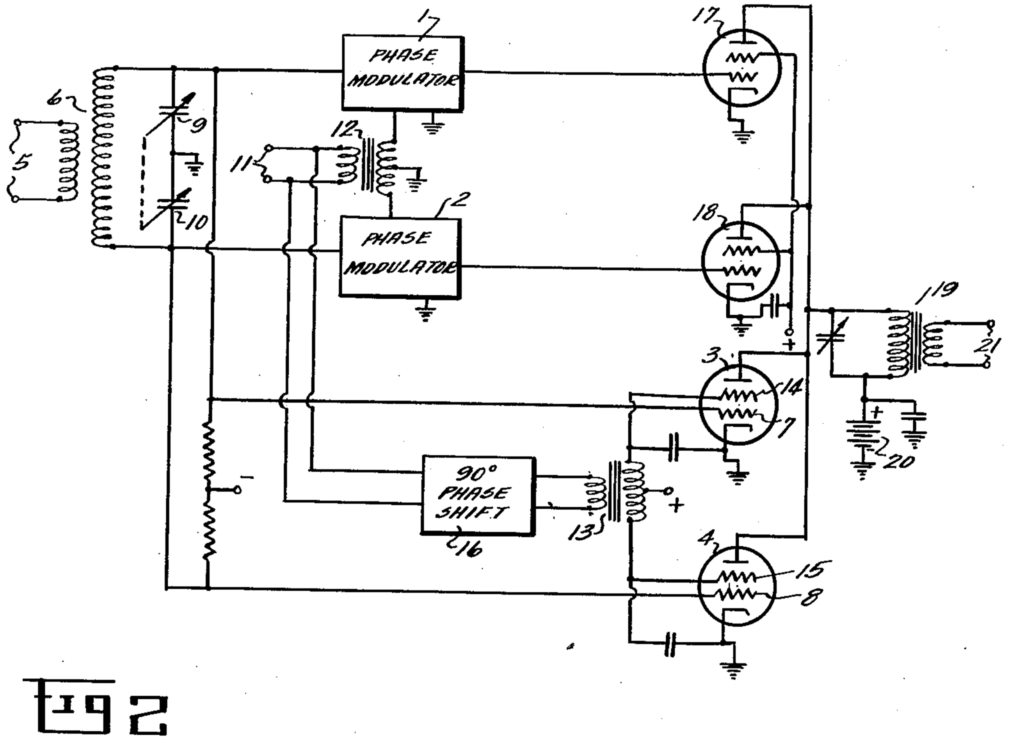
Figure 2:
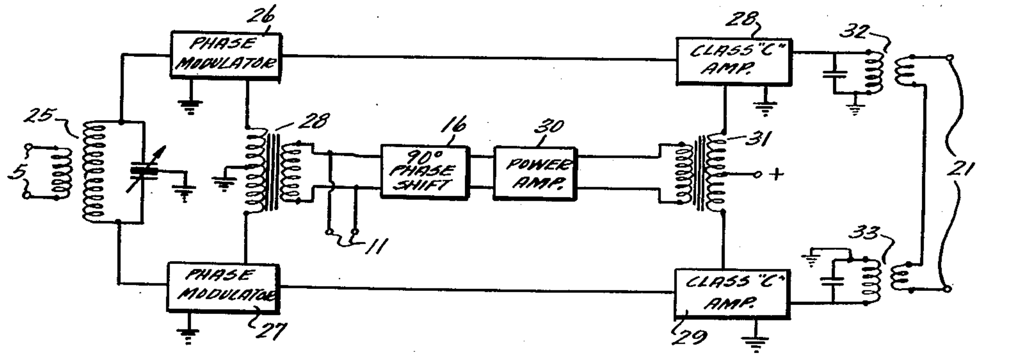
Figure 3:
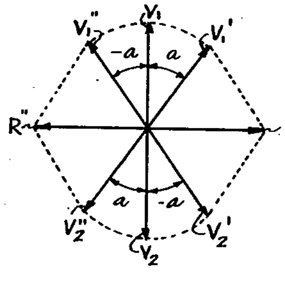

A more detailed description of the invention will be given in connection with the specific embodiments thereof shown in the accompanying drawing in which Fig. 1 shows a single side-band signal generator in which the phase and amplitude modulators are located in parallel paths;

Fig. 2 shows a signal generator in which the phase and amplitude modulators are arranged in cascade; and Fig. 3 is a diagram illustrating the operation of the phase modulators in Figs. 1 and 2.

Referring to Fig. 1 the single side-band generator shown employs a balanced or carrier-suppressing phase modulator comprising phase modulators 1 and 2, and a balanced or carrier-suppressing amplitude modulator comprising amplitude modulator tubes 3 and 4. Radio frequency carrier energy is applied to terminals 5 and thence through tuned transformer 6 to phase modulators 1 and 2 and to the grids 7 and 8 of amplitude modulator tubes 3 and 4. The voltages at the two ends of the secondary winding of transformer 6, applied to the phase and amplitude modulators as above described, are equal and 180° out of phase due to the ground connection between variable tuning condensers 9 and 10, which are ganged so as to always have equal capacities. The modulating signal, which may be an audio signal, for example, is applied to terminals 11 and thence through transformer 12 to phase modulators 1 and 2 and through transformer 13 to the grids 14 and 15 of amplitude modulator tubes 3 and 4. As in the case of the carrier voltages, the modulating signal voltages applied to the individual phase and amplitude modulators are equal and 180° out of phase due to the grounded center taps of the secondary windings of transformers 12 and 13. Also the phase of the modulating signal applied to the balanced amplitude modulator is displaced 90° from the phase of the modulating signal applied to the balanced phase modulator due to the presence of the 90° phase shifting network 16. This network may be of any suitable type producing a constant 90° phase shift over a band of frequencies wide enough to include the range of modulating frequencies. The output signals of phase modulators 1 and 2 are applied to the control grids of phase reversing and amplifying tubes 17 and 18. The anodes of tubes 17, 18, 3 and 4 are connected together and in series with the output resonant circuit 19 and a source of direct current 20. The desired single side-band energy may be taken from output terminals 21 which are coupled through coil 22 to the resonant output circuit 19.

In explaining the operation of Fig. 1 the operation of the balanced phase and amplitude modulators will be considered first. As is well known a balanced amplitude modulator produces the upper and lower side bands but suppresses the carrier frequency. In the absence of a modulating signal on grids 14 and 15 the gains of tubes 3 and 4 are equal. The equal and oppositely phased carrier signals on grids 7 and 8 therefore produce equal and oppositely phased output signals which cancel in the common output circuit of these tubes. In the presence of a modulating signal, however, there are oppositely phased variations in the gains of tubes 3 and 4 in accordance with the amplitude of the modulating signal so that the two output signals, although still of opposite phase, are no longer of the same amplitude. This results in a signal of carrier frequency in the common output circuit, the amplitude of which is equal to the difference between the amplitudes of the output signals of tubes 3 and 4. This latter signal is an amplitude modulated wave with the carrier component removed, and, as is well known, is composed of two constant amplitude waves having frequencies equal to the sum and difference of the carrier and modulating frequencies and known as the upper and lower side bands, respectively. The phase of the resultant output signal produced by the balanced amplitude modulator is the same as that of the output signal of that tube of the pair of tubes 3 and 4 which has the greater gain at the particular instant. Therefore the phase of the output signal will be either the same as or opposite to the phase of the signal on either of grids 7 and 8.

The balanced phase modulator in Fig. 1 also produces an output signal in the common output circuit that is composed of upper and lower side bands as in the case of the above described balanced amplitude modulator. However, the phase relation between this signal and the original carrier is 90° different from that existing between the output signal and the original carrier in the case of the balanced amplitude modulator. The operation of the balanced phase modulator is illustrated by the vector diagram of Fig. 3. In this figure vectors $V_1$ and $V_2$ represent the output signal of phase modulators 1 and 2 in the absence of a modulating signal. In the presence of a modulating signal the phases of $V_1$ and $V_2$ are advanced or retarded, depending upon the polarity of the modulating signal, through an angle proportional to the instantaneous amplitude of the modulating signal. The phase shifts of $V_1$ and $V_2$ are equal and in opposite directions due to the equal amplitude and opposed phases of the modulating voltages applied to phase modulators 1 and 2. Assuming in Fig. 3 that the maximum phase deviation is "$a$," then the vectors representing the outputs of phase modulators 1 and 2 will always lie somewhere between the extremes $V_1'$—$V_1''$ and $V_2'$—$V_2''$. Since the output circuits of tubes 17 and 18 are connected in parallel to resonant circuit 19 the signal developed across this circuit due to the balanced phase modulator is the resultant of the two outputs of modulators 1 and 2. Since $V_1$ and $V_2$ are 180° out of phase when the modulating signal is zero, the resultant output at circuit 19 for this condition is zero so that, as in the case of the balanced amplitude modulator, the carrier does not appear in the final output. For the maximum modulating signal amplitude of one polarity the vectors $V_1'$ and $V_2'$ produce the resultant R′ and for the maximum amplitude of the other polarity the vectors $V_1''$ and $V_2''$ produce the resultant R″. For all intermediate values of the modulating signal the resultant output lies between the extremes of zero and the value represented by the lengths of vectors R′ and R″, with the phase of the resultant output reversing each time the modulating signal passes through zero as represented by the 180° displacement of vectors R′ and R″. The character of the signal developed across circuit 19 by the balanced phase modulators is therefore identical to that produced by the balanced amplitude modulators, except as to phase, and is composed of the same upper and lower side bands.

With regard to the phase relations between the output signals of the two modulators it has already been pointed out that the resultant output signal of the balanced amplitude modulator is either in phase or 180° out of phase with the carrier input to the modulator. In Fig. 3 it is seen that the resultant output signal always has a 90° phase relation to $V_1$ and $V_2$. If there is no through phase shift in modulators 1 and 2 the output signals of these modulators for zero modulating signal, as represented by $V_1$ and $V_2$ in Fig. 3, are of the same phase as the respective input signals. Since the input signals to the two balanced modulators are identical it follows that a 90° phase difference exists between the resultant output signals of the two modulators, and consequently between the corresponding side-band signals composing the resultant output signals. This inherent quadrature relationship between the corresponding side bands makes the use of a 90° radio frequency phase shifting network unnecessary. An example of a phase modulator having no through phase shift and suitable for phase modulators 1 and 2 is the "Phasitron" tube developed by the General Electric Company.

The manner in which one of the side bands cancels in the common output circuit of Fig. 1 leaving only a single side-band output may be seen from the following considerations: The equation of an amplitude modulatod wave is $$e=E(1+m \sin pt) \sin wt \quad (1)$$

in which $e$=instantaneous amplitude of the wave
E=average amplitude of the wave
$m$=degree of modulation
$p$=angular velocity of modulating frequency
$w$=angular velocity of carrier frequency If there is a 90° phase shift of the modulating frequency, such as produced by network 16 in Fig. 1, Equation 1 becomes $$e=E(1+m \cos pt) \sin wt \quad (2)$$

Equation 2 may be expanded as follows:

$$e=E \sin wt+\frac{mE}{2} \sin (w-p)t+\frac{mE}{2} \sin (w+p)t \quad (3)$$

The three terms in Equation 3 represent, respectively, the carrier, lower and upper side bands of an amplitude modulated wave.

The equation of a phase modulated wave is $$e=E' \sin (wt+m' \sin pt) \quad (4)$$

where E′ is the maximum amplitude of the wave and $m'$=modulation index for a phase modulated wave. Equation 4 may be expanded as follows:

$$e=E'J_0(m') \sin wt+E'J_1(m') \sin (w+p)t-E'J_1(m') \sin (w-p)t \quad (5)$$

in which $J_n(m')$ is a Bessel function of the first kind and $n$th order with argument $(m')$. In Equation 5 it is assumed that the modulation index is small, having a value of unity or less, in which case side bands of higher order than the first can be neglected. Like Equation 4 this equation contains carrier and upper and lower side band terms and represents a phase modulated wave with small modulation index.

As already pointed out, the carrier does not appear in the output circuits of the balanced amplitude and phase modulators of Fig. 1. Therefore, the output of the balanced amplitude modulator comprising tubes 3 and 4 may be represented by the side band terms of Equation 3, namely, the quantity $$\text{(6)}\qquad \frac{mE}{2}\sin\,(w-p)t+\frac{mE}{2}\sin\,(w+p)t$$

and the output of the balanced phase modulator comprising phase modulators 1 and 2 may be represented by the side band terms of Equation 5, namely, the quantity $$\text{(7)}\qquad E'J_1(m')\sin\,(w+p)t-E'J_1(m')\sin\,(w-p)t$$

It is clear from the above that if the circuit parameters of Fig. 1 are so adjusted that $$\text{(8)}\qquad \frac{mE}{2}=E'J_1(m')$$

then the outputs of the two modulators may be added to eliminate the lower side band or subtracted to eliminate the upper side band A single side-band generator that does not require phase modulators having no through phase shift, as in the case of Fig. 1, is shown in Fig. 2. Carrier voltage is applied at terminals 5 and a modulating signal at terminals 11. Single side-band energy is derived from output terminals 21. Transformer 25, having a tuned secondary, applies the carrier with equal amplitude and opposite phase to phase modulators 26 and 27. The modulating signal is also applied with equal amplitude and opposit phase to the phase modulators by means of transformer 28. The phase modulated output signals of modulators 26 and 27, which may be represented by vectors $V_1$—$V_1'$—$V_1''$ and $V_2$—$V_2'$—$V_2''$, are applied to class "C" amplifiers 28 and 29, respectively, where they are amplitude modulated in accordance with the modulating signal which is applied to the amplifiers with equal amplitude and opposite phase by means of transformer 31. Phase network 16 introduces a phase difference of 90° between the modulating signals as applied to the phase and amplitude modulators. A power amplifier 30 may be used if necessary. The output signals of amplifiers 28 and 29 are developed across tuned transformers 32 and 33, the secondaries of which are connected in series between output terminals 21.

The output of phase modulator 26 may be expressed by repeating Equation 4:

$$\text{(9)}\qquad e=E'\sin\,(wt+m'\sin pt)$$

If the modulation index $m'$ is small, for example unity or less, side bands and Bessel function terms above the first order may be neglected and Equation 9 may be expanded into the form $$\text{(10)}\qquad e=E'\left(J_0(m')\sin wt+J_1(m')\sin\,(w+p)t-J_1(m')\sin\,(w-p)t\right)$$

The effect of amplitude modulating the output of phase modulator 26 in modulated amplifier 28 may be demonstrated by multiplying Equation 10 by the expression $(1+m\cos pt)$ in which $m$ is the amplitude modulation index and in which the cosine function is used because of the 90° phase shift of network 16. Performing this operation and expanding the resulting product terms given the following equation for the output of modulator 28:

$$\text{(11)}\qquad e(1+m\cos pt)=E'\Big(\frac{J_1(m')m}{2}\sin\,(w+wp)t+J_1(m')\sin\,(w+p)t+\frac{J_0(m')m}{2}\sin\,(w+p)t+J_0(m')\sin wt+\frac{J_1(m')m}{2}\sin wt-\frac{J_1(m')m}{2}\sin wt-J_1(m')\sin\,(w-p)t+\frac{J_0(m')m}{2}\sin\,(w-p)t-\frac{J_1(m')m}{2}\sin\,(w-2p)t\Big)$$

In a similar manner the output signal of phase modulator 27 may be represented by the equation $$\text{(12)}\qquad e'=-E'\sin\,(wt-m'\sin pt)$$

This equation may be expanded in the form of Equation 10 and multiplied by $(1-m\cos pt)$ to obtain an expression for the output of modulator 29. Performing this operation and expanding the resulting product terms gives the following equation for the output signal of this modulator:

$$\text{(13)}\qquad e'(1-m\cos pt)=E'\Big(-\frac{J_1(m')m}{2}\sin\,(w+2p)t+J_1(m')\sin\,(w+p)t+\frac{J_0(m')m}{2}(w+p)t-J_0(m')\sin wt+\frac{J_1(m')m}{2}\sin wt-\frac{J_1(m')m}{2}\sin wt-J_1(m')\sin\,(w-p)t+\frac{J_0(m')m}{2}\sin\,(w-p)t+\frac{J_1(m')m}{2}\sin\,(w-2p)t\Big)$$

If the amplitude modulation index is given the value $$\text{(14)}\qquad m=\frac{2J_1(m')}{J_0(m')}$$

then the sum of the right hand members of Equations 11 and 13 equals the quantity $$\text{(15)}\qquad 4J_1(m')\sin\,(w+p)t$$

which represents the desired single side-band energy. Therefore when the two output signals of amplitude modulated amplifiers 28 and 29 are added by means of the series connected secondaries of transformers 32 and 33 a resultant single side-band output signal of frequency $(w+p)$ is obtained.

I claim:

1. A generator of single side-band radio frequency energy comprising a carrier suppressing phase modulator, a carrier suppressing amplitude modulator, means for applying radio frequency energy to said modulators from a common source, means for applying modulating signals in phase quadrature to said modulators, and means for combining the output signals of said two modulators to produce a single side-band signal.

2. A generator of single side-band radio frequency energy comprising modulating means for phase modulating and amplitude modulating a radio frequency wave with modulating signals in phase quadrature, said modulating means being of the carrier suppressing type, and means for linearly combining the signals produced by said modulating means.

3. A generator of single side-band radio frequency energy comprising a carrier suppressing phase modulator, a carrier suppressing amplitude modulator, means for applying radio frequency energy to said modulators in the same phase, means for applying modulating signals in phase quadrature to said modulators, and means for combining the output signals of said two modulators.

4. A generator of single side-band radio frequency energy comprising a pair of identical phase modulators, means for applying radio frequency energy to said phase modulators in opposed phase, means for applying a modulating signal to said phase modulators in opposed phase, a pair of identical amplitude modulators, means for applying the output signal of each of said phase modulators to a corresponding one of said amplitude modulators, means for applying said modulating signal to said amplitude modulators in opposed phase, means for introducing a 90° phase displacement between the modulating signal as applied to the phase modulators and the modulating signal as applied to the amplitude modulators, and means for adding the output signals of said amplitude modulators.

5. A generator of single side-band radio frequency energy comprising a pair of identical phase modulators, a pair of identical amplitude modulators, means for applying radio frequency energy in opposite phase to said pair of phase modulators and similarly to said pair of amplitude modulators, means for applying a modulating signal in opposite phase to said pair of phase modulators and similarly to said pair of amplitude modulators, means for introducing a 90° phase difference between the modulating signal as applied to the phase modulators and the modulating signal as applied to the amplitude modulators, and means for connecting the output circuits of said pair of phase modulators and said pair of amplitude modulators in parallel across a common output circuit.

OSWALD G. VILLARD, Jr.

REFERENCES CITED

The following references are of record in the file of this patent:

UNITED STATES PATENTS

| Number | Name | Date |
|---|---|---|
| 2,424,971 | Davey | Aug. 5, 1947 |